United States Patent [19]

van Voskuilen et al.

[11] Patent Number: 4,552,594
[45] Date of Patent: Nov. 12, 1985

[54] METHOD FOR REMOVING PIPE COATINGS

[76] Inventors: Dirk F. van Voskuilen; Frans van Voskuilen, both of No. 12, Stationsweg, 3931 ES Woudenberg, Netherlands

[21] Appl. No.: 529,752

[22] Filed: Sep. 6, 1983

[30] Foreign Application Priority Data

Sep. 8, 1982 [NL] Netherlands ............... 8203501

[51] Int. Cl.⁴ .................. B08B 3/02; B08B 9/02
[52] U.S. Cl. .................................. 134/34; 134/180; 134/181; 134/199
[58] Field of Search ............... 134/34, 180, 181, 199; 15/88, 104.04; 137/15

[56] References Cited

U.S. PATENT DOCUMENTS

| | | |
|---|---|---|
| 1,898,964 | 2/1933 | Jinnett . |
| 1,941,002 | 12/1933 | Harrison ............... 15/104.04 X |
| 2,427,129 | 9/1947 | Fields . |
| 3,641,608 | 2/1972 | Kratt . |
| 3,933,519 | 1/1976 | Koch et al. . |
| 3,985,572 | 10/1976 | Petermann et al. ............ 134/34 |
| 4,229,121 | 10/1980 | Brown ............... 15/104.04 X |

FOREIGN PATENT DOCUMENTS 0000808 2/1979 European Pat. Off. .

Primary Examiner—Marc L. Caroff
Attorney, Agent, or Firm—Birch, Stewart, Kolasch & Birch

[57] ABSTRACT

Bituminous and other coatings are removed from a pipe surface by directing powerful water jets, e.g. under a pressure of 300–600 bars, and preferably under an acute angle of incidence, against such pipe surface. The apparatus has one or more nozzles, each provided with water supply means, in a frame that can be mounted around the pipe to be treated. In a preferred embodiment, the nozzles are arranged in groups on rotatable annular discs which surround the pipe with some clearance and which receive a reciprocating rotary movement during operation, while the frame carrying such discs is adapted for travelling in longitudinal direction of the pipe. If both movements are coordinated, i.e. effected simultaneously then, each nozzle will follow a zigzag path along the pipe surface, thereby covering a vast area and removing bituminous or other coatings in a fast and efficient way.

4 Claims, 5 Drawing Figures

METHOD FOR REMOVING PIPE COATINGS

BACKGROUND OF THE INVENTION

This invention relates to the field of removing pipe coatings and more in particular to a method and apparatus for removing bituminous or other coatings from a pipe surface, e.g. a portion of a pipeline.

Pipes in the ground are often provided with an exterior bituminous coating comprising a fiber web wound around the pipe and impregnated with bituminous material. While such a bituxinous coating may provide sufficient corrosion resistance for a long period of time, it may be damaged after the lapse of such period in consequence of roots ingrowth or the like. Therefore, pipes should be excavated or exposed after a predetermined time period, e.g. after 20 or 30 years and the bituminous coating thereon should be removed and replaced by a fresh coating prior to reburying the pipes or re-covering them with earth.

The removal of a bituminous coating and of a primer undercoating is effected up till now by means of hand tools like e.g. knifes and it will be clear that such is a time-consuming and laborious operation.

SUMMARY OF THE INVENTION

Therefore, the invention has for its object to remove the disadvantages of the prior art and to provide a method and apparatus which are suitable for effecting the removal of bituminous as well as other coatings in an easy and efficient way.

In accordance with the invention, it has been found that an efficient and fast removal of bituminous coatings, may be effected by the use of water jets. If one or more powerful water jets are directed against the pipe surface, the bituminous coating will be rapidly released at the places of impact and will be discharged in flake form with the water used for the jets. If moreover, the water jets are allowed to travel along the pipe surface in longitudinal and circumferential direction, then a vast pipe area can be treated within a short period of time. The water as used is harmless to the environment and the flakes carried thereby will cause only minor environmental problems although they may be collected and recovered later on, if desired.

Thus, the invention provides a method of removing bituminous or other coatings from a pipe surface, by directing one or more powerful water jets against such pipe surface.

The term "powerful water jets" is meant to define water jets of high impelling pressure. This impelling pressure may in general be between 300 and 600 bars although a pressure of 300 bars will be sufficient in many cases. The number of water jets is not critical although two or four water jets, suitably distributed around the circumference of the pipe are often used in practice. Further, the angle of incidence of the water jets with regard to the pipe surface is not critical either, because the jets will be effective under any angle; however, an acute angle of incidence, when seen in the circumferential direction of the pipe will often be used in practice in order to achieve a maximum possible effect.

Further, the invention provides apparatus for removing bituminous or other coatings from a pipe surface. Such apparatus essentially comprises a frame adapted for being mounted around the pipe to be treated, and one or more nozzles directed against the pipe surface on that frame, as well as means for feeding pressurized water to the nozzles. Such apparatus is suitable for effecting the aforesaid method and may be advantageous in removing bituminous coatings from endless pipes in the open air.

In principle, the frame is needed only for carrying the other parts such as nozzles, driving means and water feeding means. It should be capable of being mounted quite easily to the pipe to be treated and preferably, it is as much open as possible in order to permit an easy discharge of water supplied by the nozzles. The number of nozzles and their angle of incidence with regard to the pipe surface are not critical; nevertheless, the same remarks as above with regard to the water jets may be made here.

Should it be desired to treat the whole surface of the pipe with a limited number of nozzles or water jets, then special provisions should be made to ensure that each water jet may reach a sufficiently large portion of that surface. According to the invention, such provisions may comprise means for moving the nozzles in longitudinal as well as in circumferential direction of the pipe along the pipe surface. Means for moving the nozzles in longitudinal direction will preferably comprise travelling wheels and driving rollers carried by the frame and engaging the pipe. Means for moving the nozzles in circumferential direction will preferably comprise one or more rotatable annular discs positioned in planes perpendicular to the longitudinal axis of the pipe and surrounding the pipe concentrically with some spacing, said discs carrying the nozzles in groups, and means for rotating the discs around their axes. Such a construction is easy to realize and may serve to reach the desired purpose in an efficient way provided that the means for moving in longitudinal and circumferential direction are suitably coordinated.

In may be desirable in many cases that the nozzles are unable to perform a complete revolution of 360° during their travel in circumferential direction of the pipe, because there is a risk then that the water feeding means such as e.g. water hoses would get entangled around the pipe. Therefore, in a preferred embodiment of the invention, arrangements have been made to move the nozzles in a zigzag path along the pipe surface, such zigzag path having the longitudinal direction of the pipe as its main direction, and to ensure that the paths of adjacent nozzles are closely spaced in circumferential direction. With such an embodiment, any entanglement of hoses or other water feeding means can be positively prevented. Such embodiment can be realised e.g. by adapting the means for rotation of the nozzle-carrying annular discs in such a way that the discs will get a reciprocating rotary movement along a restricted rotation angle. Further, in order to prevent that unwanted reaction forces are acting on the frame or pipe in that case, the rotational means of two adjacent discs may be coupled in such way that the discs will always rotate in mutually opposite directions. This will lead to a balanced high speed apparatus suitable for treating pipes in an efficient manner.

With regard to the travelling movement of the nozzles in longitudinal direction, it is preferable to have the travelling wheels adjustably supported. Further, it is preferable that the driving rollers are supported by hinged levers which are biased to engage the pipe by means of e.g. a spring mechanism or a hydraulic cylinder, in such a way that treatment of an angular pipe section is possible.

In total, the invention provides a method and apparatus suitable for fast and effective removal of a bituminous or other pipe coating.

BRIEF DESCRIPTION OF THE DRAWINGS

The invention will now be described with reference to the drawings which show an embodiment of the invented apparatus by way of example. Such embodiment is intended for removing a bituminous coating from a pipe surface.

DESCRIPTION OF THE PREFERRED EMBODIMENT

Figure 1:
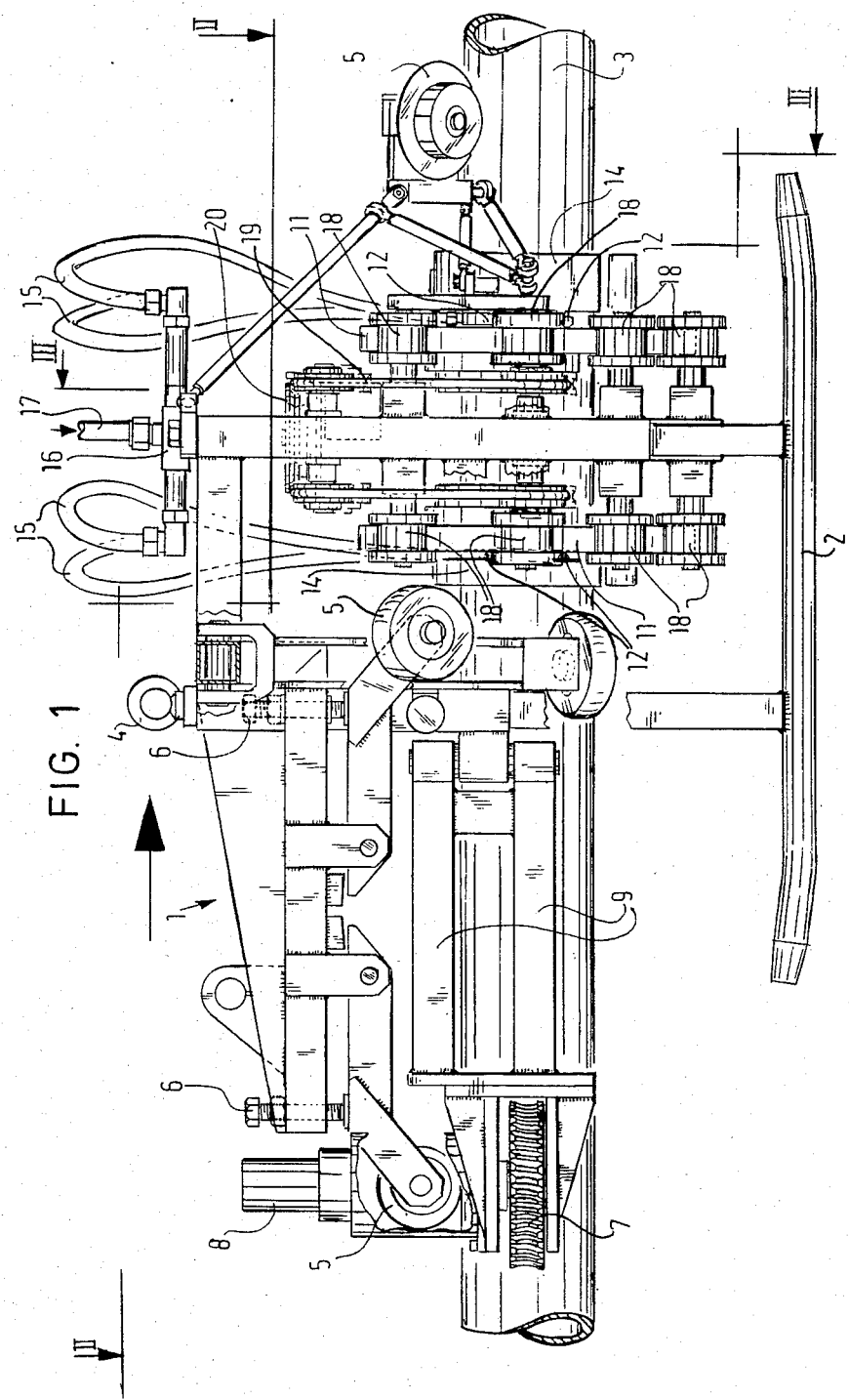
FIG. 1 is a side view of this embodiment.
Figure 2:
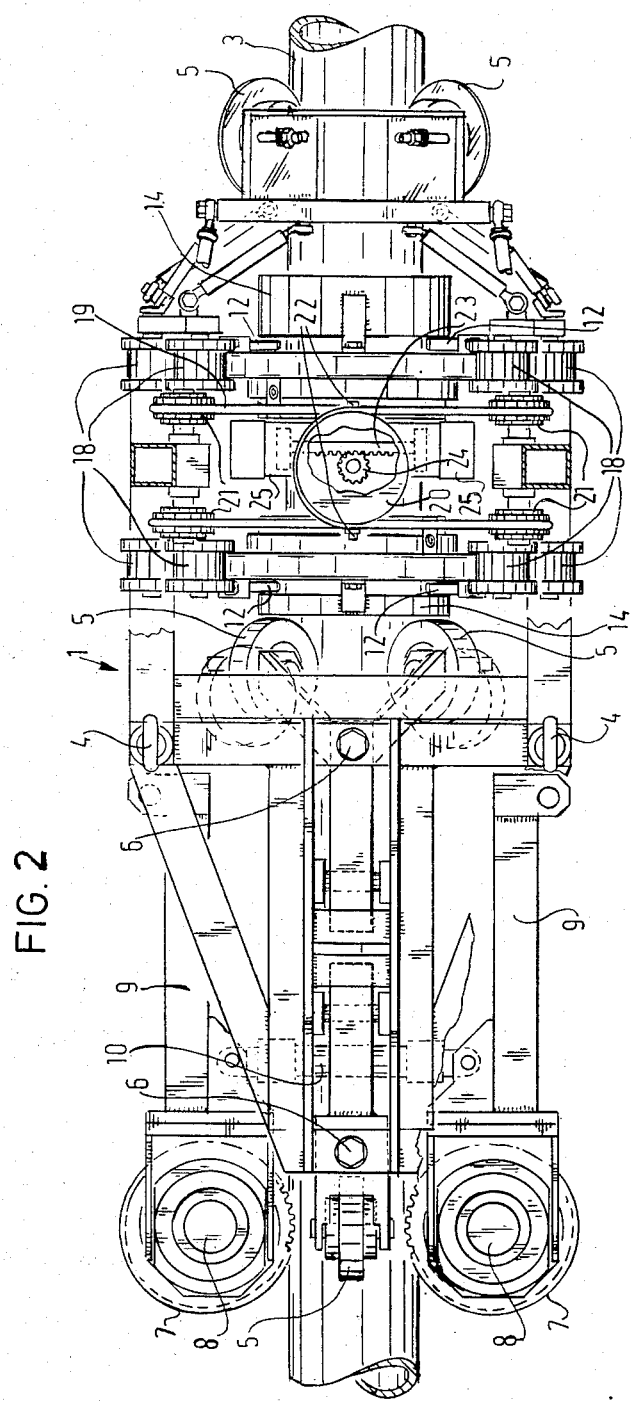
FIG. 2 is a plan view of this embodiment along the lines II—II of FIG. 1.
Figure 3:
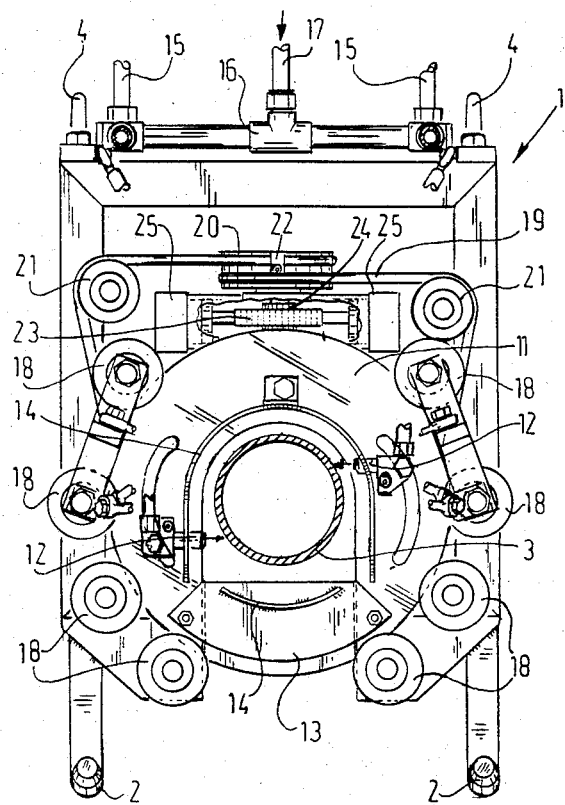
FIG. 3 is a front view of this embodiment, along the lines III—III of FIG. 1.

The apparatus of FIGS. 1 to 3 has a frame 1 which is open from below and which may rest on the ground, if necessary, by means of a sledge 2. During operation, it is mounted around a pipe 3 to be treated and will be supported by that pipe then. Presuming that pipe 3 is an endless pipe, e.g. an exposed portion of a pipeline, frame 1 may be lifted easily by engaging eyes 4 thereon and may be lowered from above onto the pipe 3.

Frame 1 is resting on the pipe 3 by means of travelling wheels 5, for the major part arranged in pairs, which further act as guides during travel of the frame along the pipe in longitudinal direction. The travelling wheels are adjustable in position (compare e.g. the adjusting bolts 6) for the sake of centration.

Frame 1 further carries a pair of knurled driving rollers 7,7 driven by a hydromotor 8, for travel of the frame along the pipe in longitudinal direction. The driving rollers 7,7 are fixed to the free ends of a pair of hinged levers 9,9 which are pulled together by means of a hydraulic cylinder 10 so as to ensure that the driving rollers 7,7 will firmly engage pipe 3.

Within the frame are two annular discs 11,11, carrying nozzles 12,12. The discs 11,11 are rotatably mounted and positioned in planes which are perpendicular to the longitudinal direction of the pipe during operation. Further, the discs 11,11 will surround the pipe 3 concentrically and with some spacing. Each disc 11 has a detachable portion 13 in order to permit mounting the disc around pipe 3, and is provided with a guard hood 14 for the water to be sprayed.

The nozzles 12,12 have been mounted in such a way on discs 11,11 that they are directed towards pipe 3 and that water jets from these nozzles will hit the pipe under an acute impact angle, when seen in circumferential direction. Both the mounting position and the angular position of the nozzles are adjustable, however.

Each of the nozzles 12 has been connected by means of hoses 15 to a distribution system 16 for pressurised water, said distribution system having a central feed 17.

Figure 4:
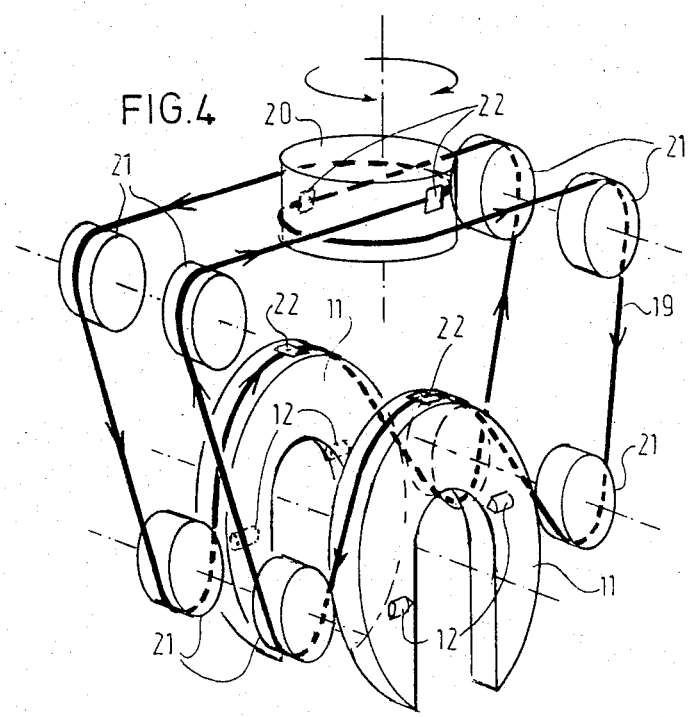
FIG. 4 shows the rotational system of the annular discs in this embodiment on a larger scale.

The annular discs 11,11 are freely rotatable in frame 1 by means of a series of guiding rollers 18,18. They are driven by a rope 19 passing along a driving roller 20 and further along guiding rollers 21,21, such guiding rollers being positioned in such a way that the rope will engage a portion of the circumference of each annular disc. According to FIG. 4, only a single rope 19 and a single driving roller 20 are used for driving both annular discs 11,11, although two series of guiding rollers 21,21 are present and locking clamps 22 are used for preventing the rope from slipping off the driving roller or the annular discs. The driving roller 20 is driven by a rack-and-pinion system 23,24 and the rack 23 is driven by two hydraulic cylinders 25,25. In consequence of this driving system, the annular discs 11,11 and the driving roller 20 will get a reciprocating rotary movement and both discs will always simultaneously rotate in mutually opposite directions. The rotation angle of each annular disc 11 is less than 360° and in the case of two annular discs, each carrying two nozzles (like shown), the rotation angle will be somewhat more than 90°, like for instance 110–120°.

The apparatus as shown is prepared for operation by positioning it on the pipe 3 to be treated and mounting detachable portions 13 onto the annular discs 11. Further, the travelling wheels 5 are adjusted in position and care is taken that the driving rollers 7 will engage pipe 3 correctly. Thereafter, the various moving systems as well as the nozzles are put into operation. Activation of hydromotor 8 will ensure through driving rollers 7,7 that frame 1 is moved with a certain speed in longitudinal direction along pipe 3, and activation of cylinders 25,25 will result into a reciprocating movement of the annular discs 11,11 in circumferential direction of the pipe. If both types of movement are effected simultaneously, the nozzles 12,12 will each follow a zigzag path along the pipe surface, such zigzag path having its main direction in longitudinal direction of the pipe and having closely contiguous path sections. Since 4 nozzles are present in the apparatus as shown, each of them having a rotation angle in circumferential direction of more than 90°, the paths of adjacent nozzles will be closely spaced and run in correspondence with each other.

Pressurised water is fed to the nozzles 12,12 so as to direct powerful water jets against the surface of pipe 3 to remove a bituminous coating and a primer undercoating (if any) from that surface. Such removal of a bituminous coating may be effected very efficiently, due to the force of the water jets, and the whole surface of the pipe may be treated for great lengths, due to the movement of nozzles in longitudinal and circumferential direction.

In a practical example, the apparatus as shown is moved at a speed of 15 to 20 m/hour along a pipe of 150 mm in diameter. The annular discs are reciprocating 15 times per minute and the four nozzles discharge water jets of 15 tot 25 mm in width under an adjustable pressure of 300 to 600 bars. Under such circumstances, the whole pipe surface may be freed from its bituminous coating in a rapid and efficient way.

In the foregoing description, it has been shown that the systems for movement in longitudinal and circumferential direction are driven by hydromotor 8 and hydraulic cylinders 25,25, resp. These driving members have actuating means (not shown) which may be positioned on the apparatus itself but are preferably positioned on auxiliary equipment, such as e.g. a truck running with the apparatus along the pipe. The actuating means for hydromotor 8 and for hydraulic cylinders 25,25 may be separate but have preferably been coupled, such as e.g. by a common switch on a switch board, in order to ensure that both driving members are actuated simultaneously and that the nozzles will follow a zigzag path along the pipe surface.

Figure 5:
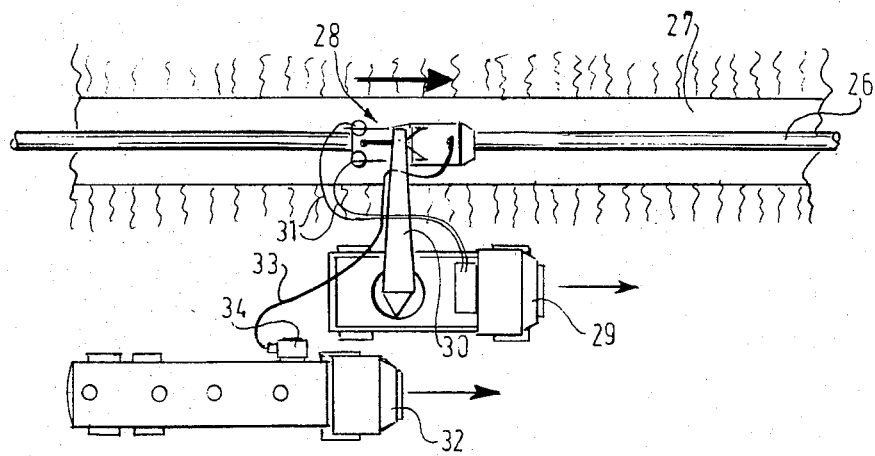
FIG. 5 is a view showing the invented apparatus in operation.

In FIG. 5, the invented apparatus is shown in operation during the removal of a bituminous coating from a pipeline. Pipeline 26 is resting in position and is not divided into separate sections meaning that a flow of fluids through the pipeline need not be interrupted. In stead thereof, a groove 27 of sufficient dimensions to permit installation and operation of the invented apparatus is cut around the pipeline.

Apparatus 28 is lifted by means of a crane 30 standing on a truck 29 and is placed onto the exposed portion of the pipeline whereupon the driving members for movement in longitudinal and circumferential direction are actuated simultaneously by actuating means on truck 29 through the intermediary of hydraulic pipes 31. The truck will keep the apparatus 28 in balance through crane 30 and will run with apparatus 28 along the pipeline. The water needed for removal of the bituminous coating is contained in a tank lorry 32 and is fed through a pump 34 and flexible hoses 33 to apparatus 28 where it is distributed among the nozzles and directed against the surface of the pipeline in the form of powerful water jets. In this way, a pipeline section of unrestricted length may be freed of a bituminous or other coating in continuous operation.

Thanks to the fact that the travelling wheels 5 are adjustable and that driving rollers 7 are hingedly supported, it is possible with the invented apparatus to treat angular sections having a curvature radius of 5 meters at minimum, without any need for additional measures of special nature.

In the foregoing description, the invention has been shown for utilisation in the removal of bituminous coatings. It should be noted, however, that the invention is not limited to such utilisation and may also be used for removal of other types of coating such as for instance polyethylene coatings.

We claim:

1. A method of removing bituminous or other coatings from an outer pipe surface having a circumferential and longtudinal direction comprising the following steps:
    directing one or more powerful water jets against said outer pipe surface with a pressure of between 300 and 600 bars;
    directing said water jets against said outer pipe surface at an acute impact angle relative to said circumferential direction of the pipe; and
    moving each of said water jets in a zigzag path along said outer pipe surface;
    said zigzag path having the longitudinal direction of the pipe as its main direction, with paths of adjacent water jets being closely spaced in said circumferential direction.

2. A method according to claim 1, wherein two water jets are directed against said outer pipe surface.

3. A method according to claim 1, wherein four water jets are directed against said outer pipe surface.

4. A method according to claim 1, wherein said water jets are mounted on at least one rotatable annular disc rotatable about an axis.

* * * * *